W. M. STEEL.
CORN-PLANTER.

No. 193,465. Patented July 24, 1877.

WITNESSES:
C. Neveux
J. H. Scarborough

INVENTOR:
W. M. Steel
BY Munn
ATTORNEYS.

UNITED STATES PATENT OFFICE.

WILLIAM M. STEEL, OF WHITE DAY, WEST VIRGINIA.

IMPROVEMENT IN CORN-PLANTERS.

Specification forming part of Letters Patent No. 193,465, dated July 24, 1877; application filed May 5, 1877.

*To all whom it may concern:*

Figure 1:
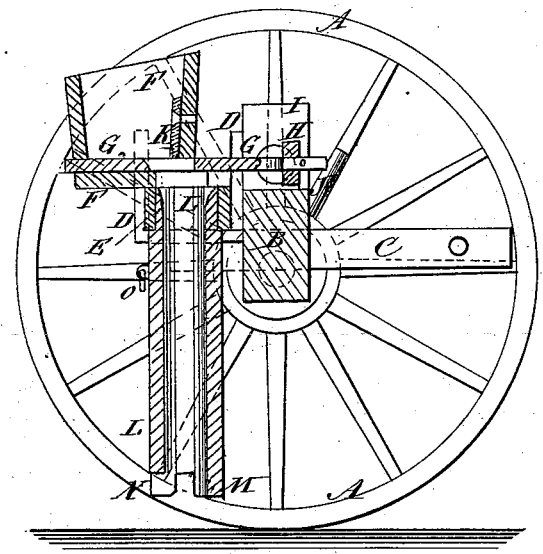
Figure 2:
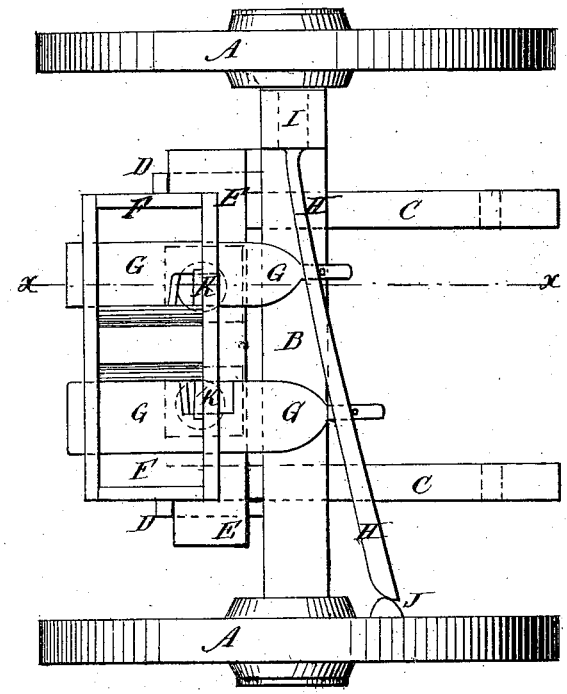

Be it known that I, WILLIAM MORRIS STEEL, of White Day, in the county of Monongalia and State of West Virginia, have invented a new and useful Improvement in Corn-Planters, of which the following is a specification:

Figure 1 is a vertical longitudinal section of my improved corn-planter, taken through the line $x\,x$, Fig. 2. Fig. 2 is a top view of the same.

Similar letters of reference indicate corresponding parts.

The invention consists in the combination of the U-shaped iron bars with the axle of the sulky, to adapt it to receive the operating parts of the machine; and in the combination of the bar, the hopper or hoppers, the dropping-slides, the spring-bar, the stud, and the block or blocks with the U-bars and the axle and wheel of the sulky.

A represents the wheels, B the axle, and C the tongue-hounds, of the sulky, which may be the forward part of the running-gearing of a wagon, or may be made expressly for the machine, as may be most convenient.

To the rear side of the axle B are bolted the forward arms of two U-shaped iron bars, D, within which is secured a wooden bar, E. To the bar E is attached a long hopper, F, or two short hoppers, to receive the seed, and from which the seed is removed by the dropping-slides G. The slides G have holes formed in them of such a size as to contain enough seed for a hill, and pass through slots in the front and rear sides of the hopper F.

The forward ends of the dropping-slides G are pivoted to a spring-bar, H, one end of which is attached to a stud, I, attached to the axle B near one wheel, A, and its other end projects, so as to be struck by a block or blocks, J, attached to the spoke or spokes of the other wheel, A. The slides G are kept from carrying out any more seed than enough to fill their dropping-holes by the rubber blocks K, attached to the forward side of the hopper F.

The seed drops from the slides G, through holes in the bar E, into the conductor-spouts L, attached to the lower side of the said bar E, and upon the lower ends of which are formed, or to them are attached, points M to open the soil to receive the seed, and points N to cover the seed.

The spouts L are connected by a rod, O, so that their lower ends may be adjusted to plant the rows wider apart or closer together. The distance apart of the hills is regulated by the number of blocks J attached to the spokes of the wheels A. The amount of seed dropped for a hill is regulated by using slides G with larger or smaller dropping-holes.

Having thus described my invention, I claim as new and desire to secure by Letters Patent—

1. The combination of the U-shaped iron bars D with the axle B of the sulky A B C, to adapt it to receive the operating parts of the machine, substantially as herein shown and described.

2. The combination of the bar E, the hopper or hoppers F, the dropping-slides G, the spring-bar H, the stud I, and the block or blocks J with the U-bars D and the axle B and wheel A of the sulky, substantially as herein shown and described.

WILLIAM M. STEEL.

Witnesses:
SAMUEL E. B. KRAMER,
H. L. HUTCHISON.